Sept. 16, 1958    H. A. BAKKE ET AL    2,852,742
LOW-COST ELECTRIC INSTRUMENT
Filed Dec. 28, 1954    2 Sheets-Sheet 1
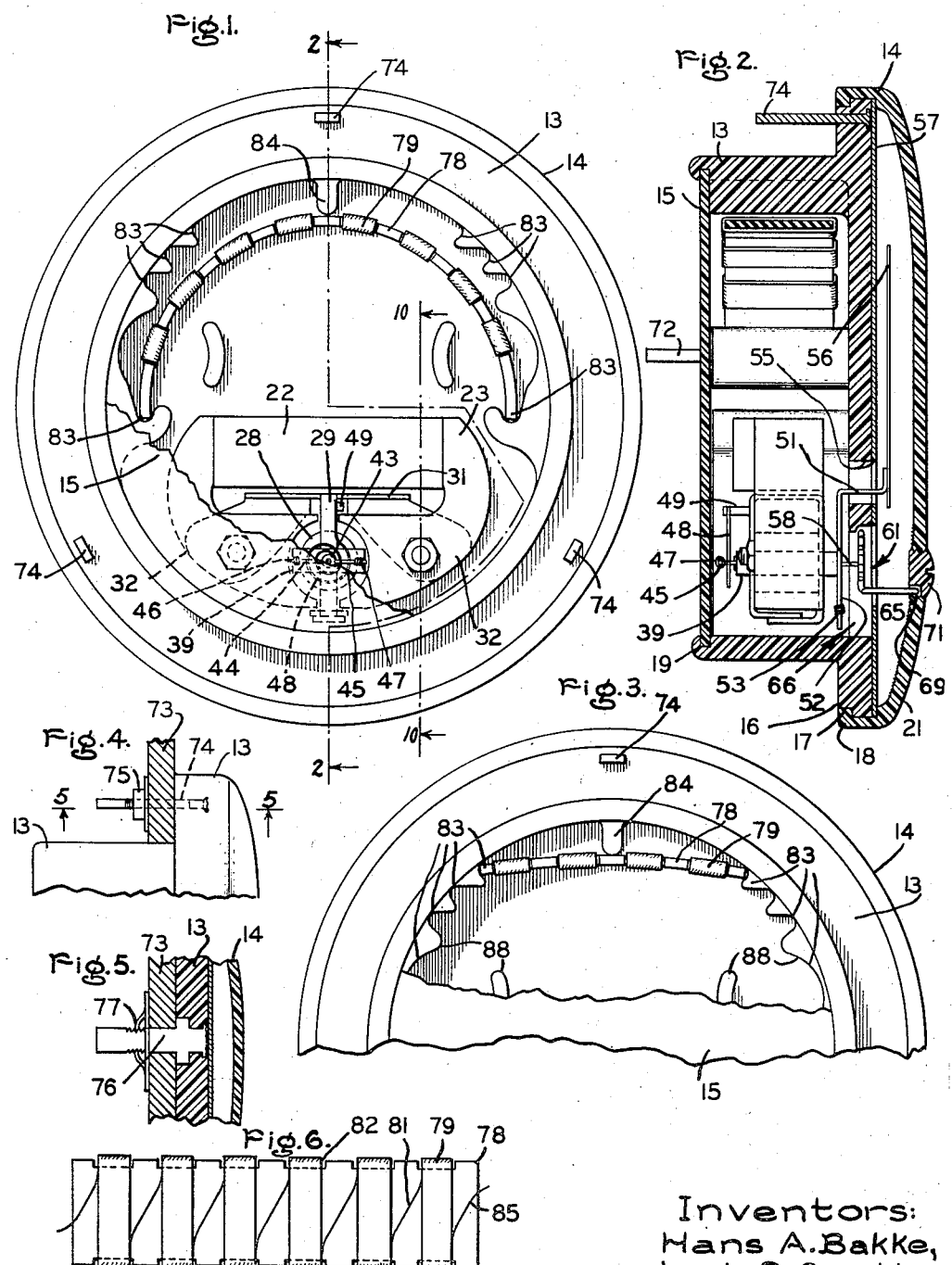
Inventors:
Hans A. Bakke,
Jack S. Gantt,
by Richard E. Horley
Their Attorney.

Sept. 16, 1958     H. A. BAKKE ET AL     2,852,742
LOW-COST ELECTRIC INSTRUMENT
Filed Dec. 28, 1954     2 Sheets-Sheet 2
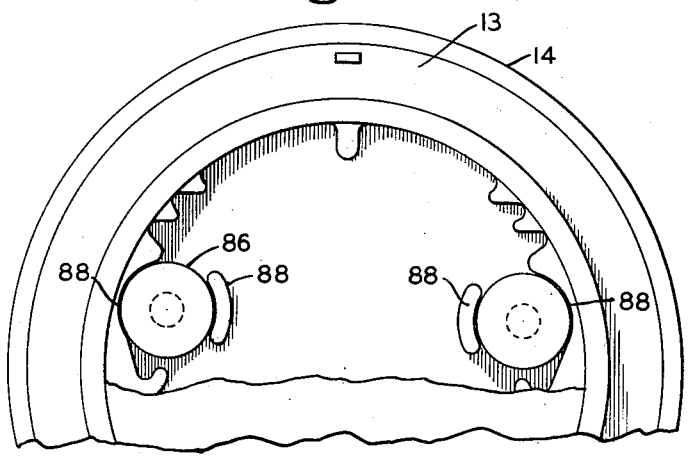
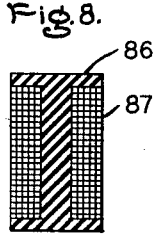
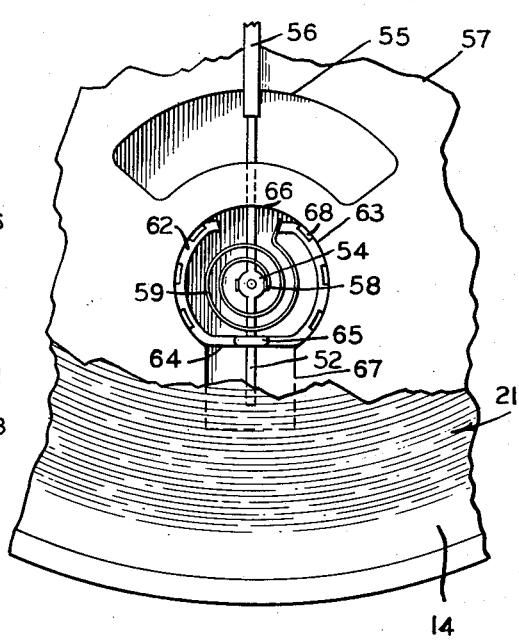
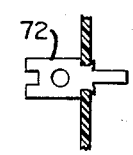
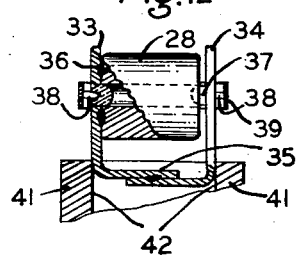
Inventors:
Hans A. Bakke,
Jack S. Gantt,
by Richard E. Hooley
Their Attorney.

United States Patent Office 2,852,742
Patented Sept. 16, 1958

2,852,742

LOW-COST ELECTRIC INSTRUMENT

Hans A. Bakke, Swampscott, Mass., and Jack S. Gantt, Cincinnati, Ohio, assignors to General Electric Company, a corporation of New York Application December 28, 1954, Serial No. 478,084

5 Claims. (Cl. 324—115)

This invention relates generally to electric instruments and, in particular, to improvements in such an instrument which facilitate mass production thereof at low manufacturing costs, and which result in an instrument having a simple mechanical construction, an attractive appearance, high quality performance, effective sealing, and strength and ruggedness.

In the art of electric instrument, and, in particular, with so-called "miniature" low-cost instruments, there has long been the desire to manufacture such miniature instruments by the use of economical mass production techniques. However, a major obstacle blocking the optimum use of effective mass production techniques has been the necessity of providing a complete line of instruments having a rather wide range in instrument rating. That is, a line of instruments in the electrical measuring field should be able to handle a range in current or a range in voltage or a range in some other electrical quantity, and to accomplish that range it has been necessary to provide such instruments with a wide range in internal resistance. In the mass production of such a line of instruments, it has been necessary to produce and stock a great many different resistor parts and matching scale plates. This introduces extremely complicated and costly inventory and assembly problems, which have the effect of significantly taking away from any cost advantages derived from the mass production techniques utilized.

Another difficulty that has long contributed to high manufacturing costs, particularly in the case of moving coil type instruments, has been the need for accurate positioning of the jewelled bearings normally used to rotatably support the moving element. Various methods have been proposed to reduce the cost attendant to this portion of the equipment, but the methods heretofore used have normally involved unavoidable time-consuming assembly labor, which, of course, adds to the cost of the instrument.

In addition, the designs selected for other details and components of such instruments have often led to increased manufacturing costs. For example, important features such as the instrument housing mounting, screws, terminals, adjusting and calibration means, and the like have often been designed such that excessive manufacturing costs result therefrom.

Accordingly, it is an object of the invention to provide a new and improved electric instrument ideally adapted for mass production at minimum costs of manufacture, whereby a line of instruments can be manufactured having a wide range in rating.

It is another object of the invention to reduce the time heretofore required in the assembly, adjustment, and calibration of the electric instruments manufactured in large quantities.

It is still another object of the invention to provide a miniature electric instrument that has high quality performance, effective sealing, and simple and rugged mechanical design, together with low manufacturing costs.

Briefly, the invention comprises the use of a molded plastic instrument housing in which a standard instrument mechanism may be readily installed. The housing is provided with a novel construction permitting the use of a wide range of resistor elements that can be installed simply by insertion within the housing in a prescribed manner. The housing is molded with appropriate slots, pockets, and other devices which permit many of the instrument parts to be snapped in place and held therein without resort to time consuming fastening operations. Additionally, effective sealing is available through proper design and processing of the plastic parts forming the instrument housing. Furthermore, a novel jewel-bearing supporting bracket, in combination with a simple fixture, provides low cost setting of the bearing spacing.

As a part of the invention, a novel resistor unit is achieved through the use of an elongated flat supporting member on which is mounted at spaced intervals a plurality of flat resistor coil units. The elongated member can be formed as a continuous strip, and variations in resistance can be obtained by severing the strip between adjacent coil units to provide a range of predetermined length corresponding to any predetermined range in resistance required. These strips can have their opposite ends inserted into spaced pockets provided within the housing, and if there are a plurality of pairs of pockets arranged to accommodate different length of resistor elements, a wide range in rating can be easily and economically accommodated for.

The invention will be best understood upon reference to the detailed description set forth below when taken in conjunction with the drawings annexed hereto, in which:

Figure 1 is a rear view of an instrument constructed in accordance with the invention with a part of the rear wall of the housing cut away to show portions of the mechanism arranged within the housing;

Figure 2 is a sectional view taken along the lines 2—2 of Figure 1;

Figure 3 is a partial view shown in Figure 1 illustrating how the resistor element of the arrangement shown in Figure 2 can be replaced by one similar in construction but different in length to thereby effect a change in rating of the instrument;

Figure 4 is a view partially in section and partially in elevation of an edge of the instrument illustrating how the instrument can be secured to an associated supporting panel;

Figure 5 is a view similar to that in Figure 4 showing a slightly different embodiment of the means for securing the instrument to an associated panel;

Figure 6 is a view showing one of the resistor elements adapted to be used with the instrument;

Figure 7 is a view similar to Figures 1 and 3 illustrating how the elongated resistor elements may be replaced by a resistor assembly in the form of coils wound upon molded spools;

Figure 8 is a sectional view of one of the resistor assemblies shown in Figure 7;

Figure 9 is a partial view of the front of the instrument, with portions of the outer cover removed to illustrate the pointer and details of the associated zero setting mechanism;

Figure 10 is a a partial section view taken along the lines 10—10 in Figure 1;

Figure 11 is a view taken along the lines 11—11 of Figure 10, illustrating one form of terminal that may be used with the instrument; and Figure 12 is a view partially in section and partially in elevation of the jewelled bearing supporting bracket together with the means to achieve predetermined spacing for all units manufactured.

Referring first to Figures 1 and 2, there is shown a miniature electric instrument having an instrument housing which includes a molded base 13, a cover 14, and a rear wall 15. All of the aforesaid parts may be of any suitable thermoplastic material of the type that can be readily molded and at the same time possesses adequate strength and rigidity whereby an extremely rugged housing is provided. The cover 14 may be made of a transparent material to permit ready inspection of the instrument scale, whereas the base 13 and back wall 15 may be black to provide conventional coloring for the design. The cover may be assembled to the base by a heat-spinning operation to provide an effective seal at extremely low costs without the use of gaskets and screws or other fastening means. Since the material used is thermoplastic, a suitable heated roller, together with appropriate supporting tools, may be used to achieve the spun-over arrangement of the parts. To facilitate this spun-over connection between the base and the outer cover, the outer lip 16 of the base may have an annular shoulder 17, which accommodates the spun-over portion 18 of cover 14. In the heat spinning operation, the thermoplastic material softens to allow forming into the final desired shape.

In a similar manner the rear opening of the base 13 may be provided with a suitable counter bore into which the cover 15 will be inserted, and the protruding ends 19 of the base 13 will be spun-over to form an effective seal between the parts. The cover may be provided with a series of closely spaced arcuate grooves 21 on its inner surface at the bottom thereof to render this portion of the cover more or less opaque, leaving the upper surface clear for maximum ease of observation of the position of the indicating pointer.

The instrument mechanism utilized is of the type embodying a magnetic circuit including an air gap in which is movable a suitable electric coil element. The specific magnetic structure shown includes a permanent magnet in the form of a straight bar 22 integrally connected to the yoke 23 at opposite ends thereof. The bar magnet may be of the Alnico family having a high coercive force, and the yoke may consist of a molded and sintered powdered iron member. As is best shown in Figure 10, the yoke is provided with suitable apertures to cooperate with a pair of suitable bolts 24 provided with knurled heads 25 adapted to have the base 13 molded therearound. The bolt 24 has a shoulder portion 26 and is threaded on its outer extremity to accommodate the nuts 27. This arrangement permits the magnet structure to be securely positioned within the instrument housing.

Referring now to Figures 1, 2, 10 and 12, the magnetic circuit is completed by the use of a suitable molded and sintered powdered iron core member in the form of the cylindrical body 28, suitably attached by welding or the like to one leg of the novel jewel supporting U-shaped bracket member 29. As is best shown in Figure 1, the other leg of the U-member has a pair of oppositely projecting portions 31 extending outwardly, the ends of which are inturned at right angles thereto to form the supporting ears 32. These ears may be suitably apertured to slip over the end of bolts 24 so that the nut 27, when tightened in place, will secure not only the yoke and associated magnet but also the core and associated bracket.

As is best shown in Figure 12, the U-bracket 29 has the end portions of its side legs 33, 34 inturned toward one another, at right angles to the legs, and overlapping each other. Approximately midway between the base 31 and the overlapping ends 35, suitable bearing members, which may be in the form of glass V-jewels 36, 37 are rigidly attached to the side legs 33, 34 of the U-member, with their pivot portions facing outwardly in opposite directions to accommodate the pivot shafts 38 forming a part of the moving coil 39 of the instrument.

The bracket 29 is made of a suitable resilient material and the design is such that a uniform predetermined spacing of the jewelled bearings is achieved at minimum manufacturing costs. Thus, again referring to Figure 12, there are shown portions 41 of a fixture having a recessed opening of a predetermined width providing spaced abutments 42 adapted to accommodate the overlapping ends of the U-bracket. In the manufacture of the bracket, these ends are inserted between the spaced abutments 42, and when inserted, the spacing of the bearings is automatically determined. While in this fixture, the parts are secured rigidly together by means of welding or soldering or other suitable fastening techniques.

It is noted that the moving coil is in the form of a flat rectangular frame, and on the outer surface of its inner end, as best shown in Figures 1 and 2, it has attached thereto an U-shaped rod member 43. The U-shaped rod 43 has its base affixed to the frame and its legs extend upwardly from the frame, and each leg has its end turned outwardly at right angles to form the counterweight supports 44, 45, on which may be mounted suitable counterweights 46, 47. These counterweights may be designed to frictionally engage the supports 44, 45 to thereby facilitate their proper positioning on the frame assembly.

Affixed to one of the legs of U-shaped member 43 is one end of a conventional spirally formed instrument hair-spring 48, the other end of which is rigidly attached to a supporting member in the form of tab 49 forming a part of bracket 29.

On the other end of frame 39, there is mounted a rod 51 in the form of an S-member having the elongated tail section 52 which is affixed to the frame. The outer end of this tail section acts as a counterweight support for the counterweight 53, mounted thereon in a manner similar to the mounting arrangements for counterweights 46, 47.

As best shown in Figure 9, that portion of tail section 52 affixed to frame 39 is enlarged to form an annular supporting section 54, and it is to be noted that the base of U-shaped member 43 may be enlarged in a similar manner to facilitate joining of these rod members with the frame 39.

The base 13 is provided with an aperture 55 through which passes the outer end of S-shaped member 51 to permit mounting thereon the instrument pointer 56. A suitable instrument dial is provided by means of the plate 57 contiguous to the outer face of base 13 and clamped in place when the cover 14 is assembled to the base. A suitable scale, not shown, may be printed on the plate 57 to cooperate with pointer 56 to indicate the magnitude of the quantity being measured. The scale plate 57 is easily assembled to the base 13, and the design of this portion of the instrument facilitates the use of a wide range of scale plates having various predetermined scales printed thereon.

The annular portion 54 of S-member 51 has a small tab 58 formed therewith to which may be secured one end of another conventional spirally formed instrument hair spring 59, the outer end of which is rigidly secured to a novel zero-adjusting member 61, formed of a resilient wire having the arcuate sections 62, 63 joined by the transverse section 64 which has its mid-portion bent outwardly in the form of a pair-pin loop 65. The member 61 lies within another aperture 66 provided in base 13 and having the recess 67 extending downwardly therefrom.

The side walls of the aperture 66 are provided with a series of inner and outer, closely spaced projections 68 molded as a part of base 13 such that an annular groove is provided around the periphery of aperture 66 about midway therein.

The member 61, being resilient, may have its arcuate sections 62, 63 squeezed together to permit them to be inserted within the aforesaid grooves, and when the arcuate sections are released, a snug fit is provided for the member 61. In other words, the member 61 is snapped into place within the grooves provided around aperture 66.

The outwardly projecting loop 65 is adapted to extend into a recess 69 provided in the zero set screw 71 threadably mounted in instrument cover 14, such that any rotation of the screw 71 will carry therewith the member 61 around the groove within aperture 66. Since the hair spring 59 is attached to member 61, any motion of this member will affect the hair spring in a known manner to adjust the zero position of the instrument pointer 56.

As best shown in Figures 10 and 11, external terminals for connection of the instrument into an electrical circuit are provided by molding suitable terminal tabs 72 into the back plate 15 during the forming thereof. These tabs may be provided with small shoulders to better keep them in place for more permanent attachment.

In Figures 4 and 5, there are shown several embodiments for mounting the instrument to an associated support panel 73, a portion thereof being shown in these views. In the embodiment shown in Figure 4, the means for mounting on the panel are shown to take the form of flattened screws 74 having their inner ends molded into the base 13, and the outer ends extending outwardly through suitable apertures provided in the supporting panel for cooperation with the fastening nut 75. In Figure 5, the screw 76 has an inverted T-shaped inner head which is also adapted to be molded into base 13, the outer end being threaded to cooperate with a "speed nut" 77 or some similar quick fastening device.

There has so far been described an electric instrument having many improvements over heretofore conventional designs of the moving coil type.

For example, the use of properly designed molded plastic parts for the inner and outer covers and the base permits the instrument housing to be effectively sealed by heat-spinning techniques. Moreover, external terminals, mounting means, and supporting means for the instrument mechanism can be securely attached to the housing during the molding thereof, thus obviating the need for conventional fasteners such as screws, nuts, rivets or the like. The design of the zero setting member 61 in cooperation with the grooves molded in aperture 60 provides a very expedient method of obtaining a front-set zero setting adjustment for the instrument. All of the above contributes to reduced manufacturing costs without in any way compromising essential electrical and mechanical characteristics of the resulting instrument.

The novel design of the bearing supporting frame 29, permitting uniform spacing of the bearings during manufacture thereof with nothing more than a simple fixture comprising spaced fixed abutments, is another improvement that significantly contributes to reduced manufacturing costs.

So far, all of the improvements described, save for the mounting arrangement of the dial plate 57, have been directed to features not directly related to the matter of variations in instrument rating, and this portion of the instrument can be effectively mass-produced without regard to the many variations in rating required. In other words, that portion of the instrument so far described may be considered common and interchangeable for all instruments produced, irrespective of the rating of the final device.

To achieve a range in instrument rating in an expeditious manner, a novel and improved resistor assembly has been devised, in combination with a special configuration of the instrument housing. The design is such that any predetermined resistor assembly, corresponding to the rating required, is added to the instrument merely by insertion into special supporting arrangements formed as a standard portion of the instrument housing. No additional fastening operations are required, and a wide range in resistance can be accommodated.

Thus, referring to Figure 6, it is seen that the resistor assembly may take the form of an elongated support member in the form of a flat strip 78 on which is mounted at spaced intervals a plurality of flat resistor coils 79, interconnected by the diagonally extending resistor wire 81. The strip 78 may be of some suitable flexible insulating material, such as relatively stiff cardboard, and is provided with a series of spaced notches 82 to accommodate the resistor coils. The strips are fabricated in long lengths and then cut to size by severing between adjacent coil units to obtain predetermined lengths having predetermined resistance.

The instrument base 13 is provided with a plurality of pairs of spaced converging supporting elements in the form of pockets or grooves 83 molded as a part of the side wall of the base. These pockets accommodate the ends of the resistor strips and their converging arrangement permits the use of various lengths of resistor strips and thus provides a range in internal resistance for the instrument.

In Figure 1, it is seen that the resistor assembly includes eight resistor coil units mounted in the flexible strip. The strip is bowed and the ends are inserted within the lowermost pockets. A small abutment 84 is also molded as a part of the base 13 and this abutment cooperates with the strip to hold it in place. In assembling the instrument, the proper length of resistor assembly is selected and installed merely by insertion within the instrument. The flexing of the strip permits ready installation and serves to develop forces for retaining the strip in place after insertion.

In Figure 3, a shorter resistor assembly is used, but the manner of insertion is identical with the arrangement shown in Figure 1. In this case, the strip 78 has but four resistor coils 79 mounted thereon, and it is adapted for mounting in the uppermost pair of pockets 83. Here again, the abutment 84 cooperates with the strip 78 to hold it in place. The strip is slightly bowed to provide, to a degree at least, the same action as is provided with the more arcuate arrangement of Figure 1.

Additionally, it is possible to use several strips at once, as it is not essential for the strips to contact the abutment 84 for proper assembly although the abutment does cooperate to hold the strips in place. Furthermore, it is not absolutely essential for the strip to be symmetrically arranged as it could be assembled with its ends supported by pockets that are not oppositely disposed.

It is now apparent that the strip form of resistor assembly in combination with the arrangement of supporting elements permits great flexibility and versatility in the mass production of the instrument in that a wide range in ratings can be accommodated for by a properly coordinated design of the strip and cooperating supporting pockets. Although not shown, it is to be understood that the resistor assemblies may be easily connected to the instrument mechanism in any known manner, the ends 85 of the resistor wire being readily available for such connection.

Another embodiment of the insertable resistor assemblies is provided by the spool assemblies shown in Figures 7 and 8. Thus, the resistor assemblies in this embodiment comprise suitable supporting elements, which may be in the form of molded nylon spools 86, on which are wound the resistor coils 87. The most widely separated lower pair of pockets 83 are enlarged to form the spool-receiving products and have a plurality of arcuate portions 88 formed during the molding of the base 13 and rear cover 14. These arcuate portions provide annular cavities or recesses into which the spools 86 may be inserted, as required. The dimensions are chosen to provide a friction fit for the spools so that installation thereof is merely a matter of selection and insertion. Here again, connection with the instrument mechanism may be made in any well known manner, the coil assemblies being provided with suitable terminal leads (not shown) to effectuate such connection.

It is possible to combine both spools and strips into one instrument, if for example a complicated internal instrument circuit is desired, in which case one or two spools could be inserted in the cavities provided, and above them, one or more resistor strips could span across the upper pockets.

From the above, it is seen that a wide range in internal resistance is available in a most expeditious manner, such that the instrument can be readily manufactured by effective mass production techniques. Everything except the resistor units and matching dial scales can be produced as a unit in a strictly repetitive and continuous manner. Resistors, strips, and spools, as well as matching plates, can be stocked and added as required, on a lot basis or other convenient manufacturing unit, to provide the range in ratings required for any given production run. No other features or characteristics of the instrument are disturbed or affected by the manner of assembling the resistors. In other words, the resistor units are in the nature of accessories that can be added in an efficient and economical manner, depending upon the market demands. Inventory requirements are materially simplified in that the instruments (without scales, front and back covers and resistor assemblies) can be stocked as units and the resistor assemblies can be stocked in the form of long strips and spools. To make up the complete instrument, it is only a matter of insertion of the proper resistor or combination of resistors, installation of the scale plate, connection and wiring of the mechanism, and placement of the front and back cover.

Therefore, while particular embodiments of the subject invention have been shown and described herein, these are in the nature or description rather than limitation, and it will occur to those skilled in the art that various changes, modifications, and combinations may be made within the province of the appended claims, and without departing in spirit or scope from this invention in its broader aspects.

What we claim as new and desire to secure by Letters Patent of the United States is:

1. In an electric instrument, means for selectively establishing the magnitude of its internal resistance, comprising, in combination: an instrument housing, resistor means adapted to be mounted wthin said housing, said resistor means including an elongated flexible supporting member having a plurality of spaced resistor elements mounted thereon, said elongated supporting member being severable between adjacent resistor elements to provide selective lengths of said resistor means, and a plurality of pairs of spaced converging supports within said housing adapted to selectively receive the end portions of said selective lengths of resistor means, said supports comprising a plurality of projections within said housing and operating to slightly bow said flexible elongated supporting member whereby forces are developed which hold said elongated member in said housing.

2. In an electric instrument, means for selectively establishing the magnitude of its internal resistance, comprising, in combination: an instrument housing, resistor means adapted to be mounted within said housing, said resistor means comprising a flat elongated flexible supporting strip having a plurality of spaced flat resistor coil elements mounted thereon, said elongated strip being severable between adjacent resistor elements to provide selective lengths of said resistor means, and a plurality of pairs of spaced converging supporting elements within said housing adapted to selectively receive said flexible selective lengths of resistor means, said supporting elements comprising a plurality of grooves molded into a side wall of said housing and operating to slightly bow said flexible elongated supporting member whereby forces are developed which hold said elongated supporting member in said housing.

3. In an electric instrument, means for selectively establishing the magnitude of its internal resistance, comprising, in combination: an instrument housing, resistor means adapted to be inserted within said housing, said resistor means including an elongated resilient flexible supporting strip having a plurality of spaced flat resistor coils mounted thereon, said strip being severable between adjacent resistor coils to provide selective lengths of said resistor means, a plurality of pairs of spaced converging pockets formed in said housing to support said resistor means, said pockets being adapted to receive opposite ends of said strips and being spaced apart a distance less than the spacing between said strip ends whereby said strips are bowed when inserted in said housing, and an abutment member in said housing between said pairs of pockets bearing upon said strip when said strip is inserted in said housing.

4. In an electric instrument, means for selectively establishing the magnitude of its internal resistance in a predetermined manner, comprising, in combination: an instrument housing, resistor means adapted to be inserted within said housing, said resistor means including at least one elongated flexible supporting member having a plurality of spaced resistor elements mounted thereon and at least one supporting spool on which a resistor coil is wound, said elongated member being severable between adjacent resistor elements to provide selective elements of said resistor means, and a plurality of supporting means within said housing adapted to selectively receive said resistor means, said supporting means comprising a plurality of spaced pockets adapted to receive opposite ends of said elongated flexible supporting members and spaced apart a distance less than the spacing between the supporting member ends whereby said supporting members are bowed when inserted in said housing, said pockets being enlarged to form supporting recesses for said spools.

5. The combination defined in claim 4 in which said pockets are arranged in convergent order, the widest spaced pair of pockets being molded as a part of said housing and enlarged to form supporting recesses for said spools.

References Cited in the file of this patent

UNITED STATES PATENTS

| | | |
|---|---|---|
| 783,733 | Price | Feb. 28, 1905 |
| 1,959,592 | Macadie | May 22, 1934 |
| 1,976,498 | Hoare | Oct. 9, 1934 |
| 2,118,933 | Macadie | May 31, 1938 |
| 2,228,424 | Tonnies | Jan. 14, 1941 |
| 2,334,671 | Gibbons | Nov. 16, 1943 |
| 2,377,361 | Nalle | June 5, 1945 |
| 2,463,770 | Huber | Mar. 8, 1949 |
| 2,509,415 | Bernreuter | May 30, 1950 |
| 2,529,557 | Keroes | Nov. 14, 1950 |
| 2,560,879 | Lamb | July 17, 1951 |
| 2,673,957 | Rozett | Mar. 30, 1954 |